July 28, 1959 R. W. WARING 2,897,425
METHOD OF, AND APPARATUS FOR PRODUCING ELECTROSTATIC FORCE
Filed Oct. 21, 1958 4 Sheets-Sheet 1

INVENTOR.
ROBERT W. WARING

July 28, 1959 R. W. WARING 2,897,425
METHOD OF, AND APPARATUS FOR PRODUCING ELECTROSTATIC FORCE
Filed Oct. 21, 1958 4 Sheets-Sheet 2

*INVENTOR.*
ROBERT W. WARING

July 28, 1959 R. W. WARING 2,897,425
METHOD OF, AND APPARATUS FOR PRODUCING ELECTROSTATIC FORCE
Filed Oct. 21, 1958 4 Sheets-Sheet 3

*INVENTOR.*
ROBERT W. WARING

July 28, 1959                R. W. WARING                2,897,425
METHOD OF, AND APPARATUS FOR PRODUCING ELECTROSTATIC FORCE
Filed Oct. 21, 1958                          4 Sheets-Sheet 4
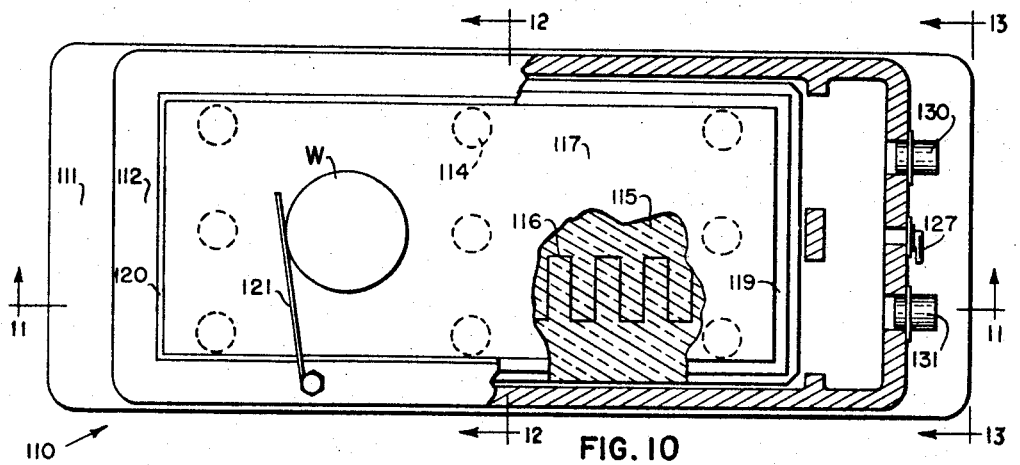
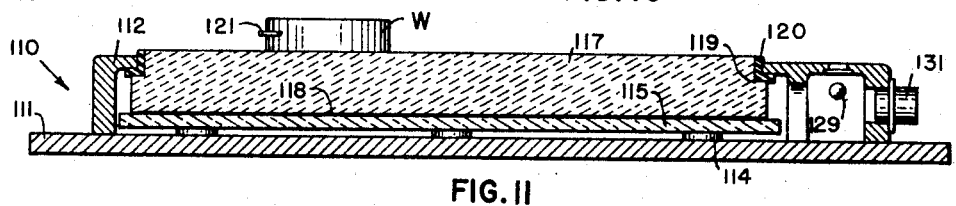
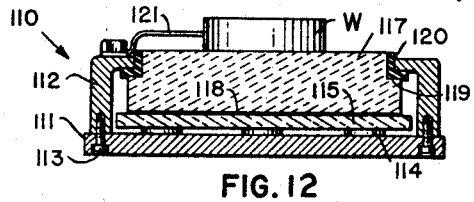
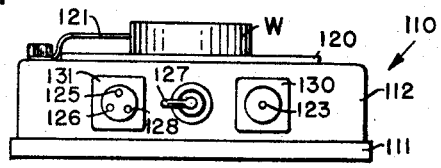
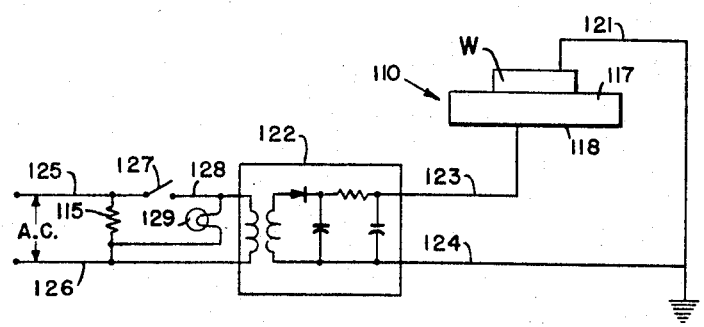
INVENTOR.
ROBERT W. WARING
BY
ATTORNEY

United States Patent Office 2,897,425
Patented July 28, 1959

2,897,425

METHOD OF AND APPARATUS FOR PRODUCING ELECTROSTATIC FORCE

Robert W. Waring, Fairfield, Conn.

Application October 21, 1958, Serial No. 777,804

59 Claims. (Cl. 317—262)

The present invention relates to apparatus involving the use of a phenomenon based on the Coulomb inverse square law, and particularly to a new and improved apparatus of this type that can be employed throughout the mechanical arts, as distinguished from electrical relays, telephones, electroscopes, electrostatic voltmeters, and the like.

This is a continuation-in-part of applications Serial Nos. 375,522 and 493,466, filed, respectively, on August 20, 1953, and March 10, 1955, in the name of Robert W. Waring, and now abandoned. The subject matter of application Serial No. 375,522 is contained in Figs. 1 to 9, pages 1 to 18 of the specification, and claims 1 to 42; and the subject matter of application Serial No. 493,466 is contained in Figs. 10 to 14, pages 43 to 50 of the specification, and claims 43 to 59, inclusive.

The above-referred-to phenomenon is best represented by the visualization of an electrical semiconductor such, for example, as limestone, to the surface of which is applied a conducting layer of material, and to the opposite smooth surface of which a conducting object, either magnetic or non-magnetic, is brought into contact. When a voltage drop is provided between the conducting surface and the conducting object, the conducting object is held more or less firmly against the limestone surface. The force set up between the semiconductor and the conducting object, either magnetic or non-magnetic, is an electrostatic force, as distinguished from an electromagnetic force. This phenomenon has been applied in the radio telephonic, electrical relay, electroscope and electrostatic voltmeter art, but, to the best knowledge of applicant, it has not found practical application in the mechanical industrial arts generally.

Under all normal atmospheric conditions, water vapor is present in the atmosphere. This water will deposit as an adsorbed film on objects with which it comes in contact, and the amount of this film will depend upon the total moisture content of the atmosphere. The temperature of an object establishes the evaporation rate of such adsorbed film. When the object temperature is sufficiently below ambient, a film of moisture droplets actually may form thereon.

The proper operation of the apparatus disclosed herein depends to a large degree upon the maintenance of a high electrical resistance at the interface of the conducting object and the semiconductor. Since it is well known that water has a relatively high conductivity, the presence of any appreciable amount of water at the interface will tend to reduce the resistivity at the interface and thereby tend to reduce the efficiency of the apparatus.

The principal object of this invention is to provide an apparatus operating in substantial accordance with the Coulomb inverse square law that is capable of wide utility within the industrial arts where relatively great mechanical forces are required.

Other objects include the provision of an apparatus that will function substantially in accordance with the Coulomb inverse square law and which will provide mechanical forces between a semiconductor and a conducting object of a magnitude far in excess of that hitherto accomplished with such apparatus; the provision of such an apparatus in which the semiconductor is provided with an object-contacting surface of a relatively thin layer of material having a relatively high resistivity, as distinguished from the resistivity of the semiconductor, or base material; the provision of such an apparatus that is constructed to provide a composite voltage gradient from its one surface to its other surface in which the gradient at the object-contacting surface increases proportionally to the increase in applied voltage over a relatively large range; the provision of such an apparatus in which the semiconductor has a resistivity between certain limits, and an object-contacting surface formed from a material having a resistivity in excess of the resistivity of said semiconductor; the provision of such an apparatus in which the conducting object is capable of being removed and replaced by like or different conducting objects; the provision of such an apparatus in which a composite article is provided having a base material of a given resistivity to the one surface of which is intimately and permanently attached a conducting layer, and to the opposite surface of which is provided a relatively thin layer of material having a resistivity in excess of that of the base material; the provision of such an apparatus embodying such a composite semiconductor for rigidly holding work while working operations are performed, such as grinding, milling, etc.; the provision of such an apparatus embodied within a structure capable of conveying magnetic or non-magnetic material; the provision of such an apparatus capable of being employed as a clutch and/or brake; and the provision of such an apparatus capable of being embodied in a servo-mechanism.

Another object of the invention is to provide a method of, and apparatus for, insuring a high electrical resistance at the interface of a conducting object and a semiconductor in electrostatic force-producing equipment.

Still other objects of the invention include the provision of a method of, and apparatus for, maintaining above ambient temperature the interface between a conducting object and a semiconductor in electrostatic force-producing equipment; the provision of such a method of, and apparatus which will produce thermal energy at the interface between a conducting object and a semiconductor in addition to that incident to the normal operation of electrostatic force-producing equipment; the provision of such a method and apparatus that prevents appreciable water film forming at said interface; and the provision of an electrostatic force-producing apparatus in which a resistance heater is combined with, and/or coupled to, a semiconductor in a manner to maintain the object-contacting surface of the semiconductor above ambient temperature.

Other objects and novel features of the invention will become apparent from the following specification and accompanying drawings, in which:

Fig. 10 is a top plan view of an electrostatic chuck to which the principles of the invention have been applied;

Fig. 11 is a sectional elevational view taken substantially along line 11—11 of Fig. 10;

Fig. 12 is a sectional elevational view taken substantially along line 12—12 of Fig. 10;

Fig. 13 is an end elevational view looking in the direction of the arrows and along line 13—13 of Fig. 10; and Fig. 14 is a schematic wiring diagram for the apparatus shown in Fig. 10.

Coulomb's inverse square law states that a potential difference between parallel conducting plates produces a force that is directly proportional to the product of the charges on the plates by virtue of the potential difference, and inversely proportional to the square of the distance between the plates. The prior art has employed a semiconducting material between the two conducting plates in order to produce mechanical forces between the plates in such devices as zero-voltage relays and radio telegraphy or telephony equipment. Such equipment requires only moderate forces. It has been found by experiment that very definite limitations attend the employment of apparatus such as has been described in the prior art.

Figure 1:
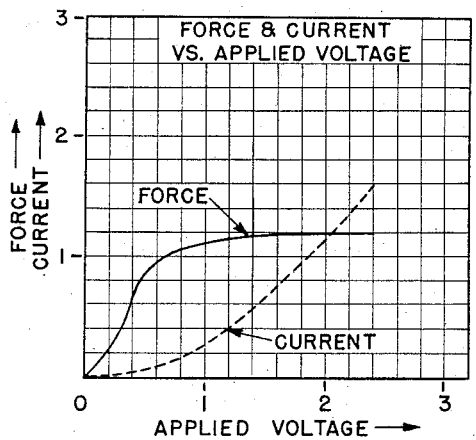
Fig. 1 is a graph showing certain characteristics of the prior art.

Referring to Fig. 1, in which is shown the results of a test embodying the teachings of the prior art, it is evident that the adhesive force increases with increasing applied voltage, and substantially with the square thereof, indicating conformity with Coulomb's law. It is also evident that definite limitations and a departure from Coulomb's law are reached at voltages which on test have proved to be in the neighborhood of 300 to 400 volts. As higher voltages are impressed on the apparatus, the curve of force fails to rise and becomes substantially horizontal. If a plot of the current flow through the apparatus is made against applied voltage, it is seen that during the time when the force is increasing in accordance with Coulomb's law, little or no current is flowing. Conversely, as the force fails to rise, larger and larger currents flow substantially in proportion to the first power of the applied voltage.

Further tests conducted on the apparatus described by the prior art have disclosed the reasons for the departure from Coulomb's law and limited force capacity. Explorations of the potential within the semiconducting member relative to the contacting body have disclosed that with increase in the current flow large potential drops (gradients) occur within the semiconducting member, effectively limiting the voltage available at its contacting face.

Figure 2:
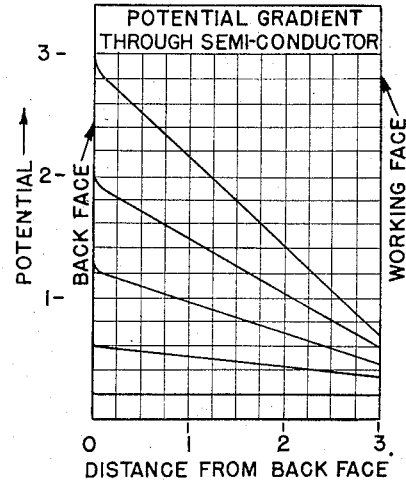
Fig. 2 is another graph showing characteristics of the prior art.

Referring to Fig. 2, it is evident that the potential gradient from the equi-potential back surface becomes greater and greater as the applied voltage and the current increase (see Fig. 1). The intercepts of these curves with the front or contacting face of the semiconductor all fall within a relatively narrow range. This narrow range appears to be the voltage on Fig. 1 at which the curve of force departs from Coulomb's law. It is apparent, therefore, that except for minor changes in the characteristics of the surfaces of contact between the semiconductor and the contacting object, the force which can be developed is fundamentally limited.

By experiment it has been found that the force curve of Fig. 1 can be markedly extended in conformance with Coulomb's law by employing a composite member between the souce of potential and the contacting body. This composite member may include a layer of a material having a relatively low resistivity intimately and permanently attached to an element of substantially higher resistivity and an additional relatively thin layer of a material having a resistivity in excess of that of said element, and applied to said element on a surface opposite that to which said other layer is attached. Of course, this latter thin layer having a resistivity in excess of that of the element may with equal facility be applied to the surface of the contacting object, rather than applied to the element. Resistivity as used throughout this specification refers to volume resistivity.

It has been found that the element of this composite member may be any material, one of the electrical characteristics of which is that its resistivity is within the range of $10^2$ to $10^{10}$ ohm centimeters. Such natural materials as limestone or slate, or any of many conducting materials that have been degraded toward an insulator, or insulating materials degraded toward a conductor, fall within this classification.

Examples of the latter are various metallic oxides such as titanium oxide which has been reduced toward the metal; or the introduction of conducting materials into an insulating compound such as the introduction of a conducting material into a rubber compound to form a homogeneous semiconducting material. The mechanical properties of such semiconductors obviously will vary over a relatively large range, and the specific semiconductor employed will depend upon the specific application to which the principles of the invention are applied.

It has been found that the relatively thin film of material having a resistivity in excess of that of the relatively thick material of the composite member may be fluid, semi-fluid, or solid in form, or combinations thereof. Examples of such fluids are low polymer silicones such as the commercially-known Dow Corning 200 Fluids and certain fluorinated hydrocarbons such a polytetrafluoroethylene and polymonochlorotrifluoroethylene. Examples of such semi-fluids are higher polymer forms of the above-mentioned materials such as the commercially-known Dow Corning #5 compound. Examples of such solids are finely divided metallic oxide materials such as $TiO_2$ and $Al_2O_3$. The latter materials may be used alone, or combined with certain insulating vehicles such as still higher polymer silicones, or phenolic or styrene materials. A desirable characteristic of some of these materials is that they may provide an increase in coefficient of friction. This relatively thin layer of material having a resistivity in excess of the semiconducting material may also be in the form of a membrane such as polyethylene terephthalate, or polystyrene. Numerous other materials having a resistivity in excess of $10^{10}$ ohm centimeters may be employed for specific applications of the principles of the invention. It is often desirable to improve the intimacy of contact between the semiconductor and the membrane as well as between the membrane and the conducting object by the use of one of the aforementioned fluid or semi-solid materials between the two. As recited in the claims, the material having a resistivity in excess of $10^{10}$ ohm centimeters shall be employed in a manner to produce optimum charges at the surface of the object to be held.

The layer of the composite member having a resistivity less than that of the semiconducting element may be any conductor, and is shown in the present embodiment as being a relatively thin metallic film that can intimately and permanently be attached to the surface of the semiconductor opposite that to which the the layer of higher resistivity is applied, and may include foil, or colloidal metals in suitable vehicular binders. Examples of foil are aluminum foil, silver or gold leaf. Examples of colloidal metals are the various silver paints adapted for printed circuit work.

It is within the scope of this invention to form such a composite member from a homogeneous element comprising an insulating material of high resistivity and reducing its resistivity from one surface to the other. This can be accomplished by carburizing a ceramic block and subsequently cutting it in half, thereby producing two such composite members.

Figure 3:
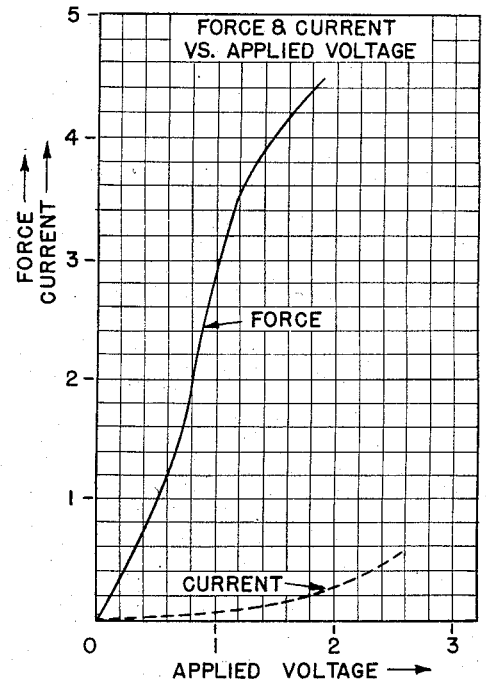
Fig. 3 is a graph showing the characteristics of apparatus to which the principles of the invention have been applied.

Employment of a composite member constructed in accordance with the above description in electrical series with a source of potential and a conducting object produces forces sufficient to satisfy the requirements of the mechanical arts. Referring to Fig. 3 which shows the results of tests on apparatus constructed in accordance with the principles of the invention, it will be seen that the force increases with the applied voltage and is in substantial conformance with Coulomb's law for a much higher applied voltage than was possible with the prior art apparatus. Also, the current flow is extremely low throughout the entire range of applied voltage, proving that the resulting force should be of the magnitude indicated.

Figure 4:
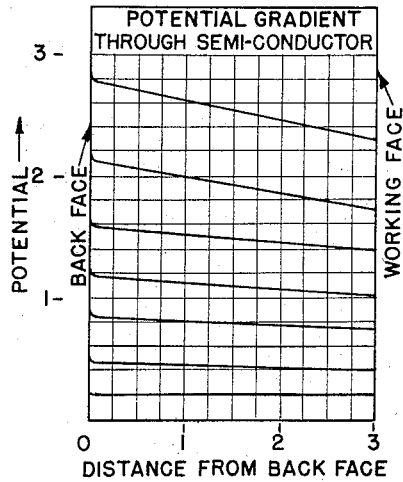
Fig. 4 is another graph showing the characteristics of apparatus to which the principles of the invention have been applied.

The above data is substantiated by Fig. 4 which represents an exploration of the potential gradient through the composite member made in accordance with the principles of this invention. From this figure it is evident that there is considerably less loss in potential between the back face, or surface of low resistivity, and the front face where the conducting object is in contact with the composite member, than there was in the case of the prior art as exemplified in Fig. 2.

Figure 5:
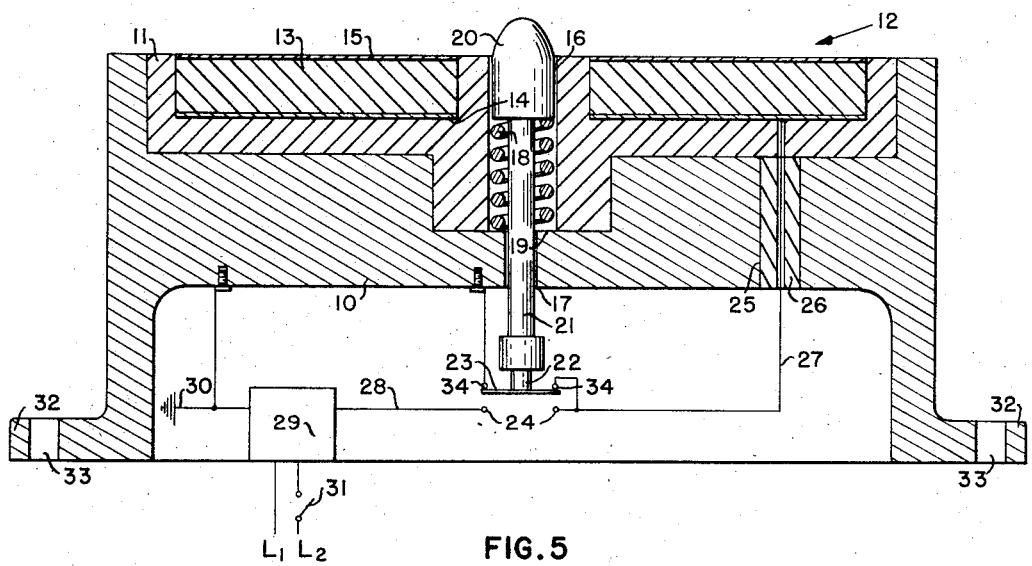
Fig. 5 is a sectional elevational view of an electrostatic chuck embodying the principles of the invention.

Referring to Fig. 5 wherein a somewhat schematic showing of a chuck or work-supporting table in sectional elevation is disclosed, a base 10 of any suitable material such as cast iron is recessed to receive an insulating liner 11 which may be any of the well-known potting compounds, or materials used for structural insulation purposes in the electrical art. The liner 11 is recessed to receive a composite member 12 in such manner that all surfaces of the member 12 excepting the top surface are entirely incased within the liner 11.

The composite member 12 comprises a core or base element 13 formed from a semiconducting material having a resistivity within the limits of $10^2$ to $10^{10}$ ohm centimeters. A bottom face coating 14 is intimately and permanently attached to the base element 13, and this coating may be any of the previously described materials having a resistivity less than $10^2$ ohm centimeters. A relatively thin layer 15 of a material having a resistivity in excess of $10^{10}$ ohm centimeters is applied to the top surface of the element 13. As previously described, a wide selection of materials for the elements 13, 14 and 15 is available and they may be selected in accordance with the results desired and the application of the principles of the invention to a specific problem.

The insulating liner 11 is provided with a bore 16 extending completely through the liner and in alignment with a smaller bore 17 within the cast iron base 10. A compression spring 18 is located within the bore 16 and acts between a shoulder 19 of the cast base 10 and the under surface of a plunger 20 adapted to be reciprocated within the bore 16. The plunger 20 is provided with a stem 21 extending downwardly through the base 10 and is provided with an insulating portion 22 that supports a switch bar 23 for cooperation with contacts 24 or 34 for a purpose to be described later.

The cast base 10 is provided with a bored opening 25 within which is located an insulating sleeve 26 through which a conductor 27 is adapted to extend and make intimate contact with the lower, relatively thin surface coating 14. The conductor 27 is connected to one of the contacts 24, and the other contact 24 is connected to a conductor 28 leading to a power pack 29.

In the application of the principles of this invention to the mechanical arts, it is extremely important that low frequency alternating current be excluded from the working areas of the apparatus in contradistinction to some of the prior art apparatus since accidental contact with low frequency alternating current promotes involuntary muscular reactions and ventricular fibrillation. With direct current or high frequency alternating current, no such muscular reaction occurs.

A preferred embodiment of the power pack 29, therefore, comprises means for stepping up alternating current to potentials of several hundred to several thousand volts, depending upon the purpose for which the mechanism will be used. It also includes means for rectification of the alternating current to provide a direct current at these higher voltages to supply electric charges to the apparatus, and suitable mechanism for protecting the operator and the power supply from overloads, or failure of any elements in the power pack. One terminal of pack 29 is connected to the lead 28 and the other terminal is connected to a ground 30, which also is connected to the base 10. Alternating current is adapted to be supplied to the power pack 29 through the lines $L_1$ and $L_2$ in the usual manner, and an on-off switch 31 is provided in the input line for the power pack 29. The on-off switch 31 is controllable by the operator and is normally adapted to be opened prior to the placing of work on the work-supporting surface 15.

The base 10 is provided with ears 32 having openings 33 extending therethrough so that the entire assembly may be removably applied to the structure of any type of machine to which it is applicable.

Since the stem 21 of the plunger 20 slidingly engages the bore 17 within the cast member 10, and the compression spring 18 seats between the under surface of the plunger 20 and the shoulder 19 of the cast member 10, a ground connection is provided to the head of the plunger 20. Accordingly, when a work piece is applied to the top of the chuck, it is grounded prior to the closing of the contacts 24 by the switch bar 23 regardless of the position of switch 31.

An additional set of contacts 34 is provided which are closed when the switch bar 23 is in its upper position, i.e., when no work is applied to the top surface 15 of the chuck. The one contact 34 extends to the cast base 10, hence to ground, and the other contact 34 is connected to the conductor 27 leading to the bottom surface 14 of the composite element 12. This arrangement may be used to insure grounding of the composite member 12 when no work is on the chuck. Its purpose is to drain off any residual static charge that may remain in the element 12 after the opening of switch 31.

Figure 6:
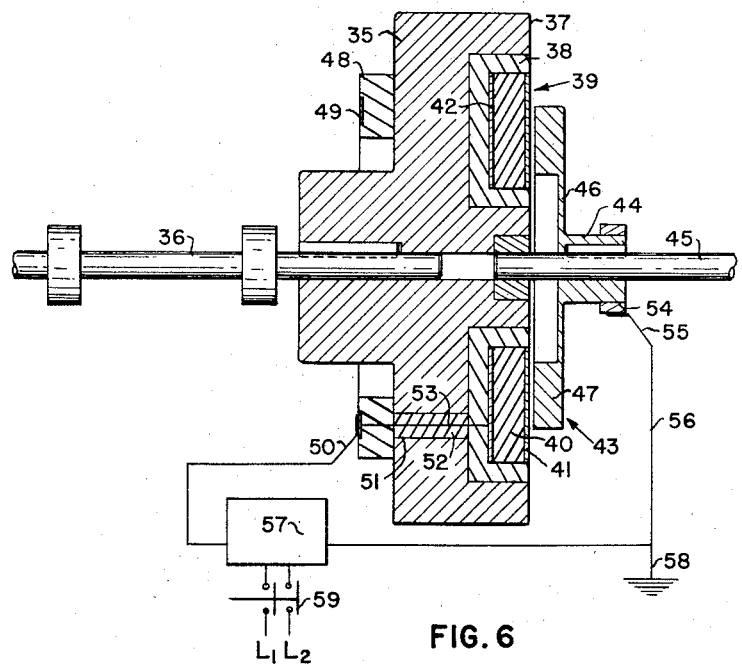
Fig. 6 is a schematic representation of a clutch, or brake mechanism, embodying the principles of the invention.

Referring to Fig. 6 in which is disclosed a sectional elevational view of a clutch to which the principles of the invention have been applied, a driving element 35 that may be made of any structural material, cast or otherwise, is keyed to an input shaft 36. The member 35 is recessed at 37 to receive an insulating liner 38 similar to the insulating liner 11 of the apparatus shown in Fig. 5. The insulating liner 38 is recessed to receive a composite member 39 similar to the composite member 12 of Fig. 5, and may be made up of elements 40, 41 and 42, selected from the categories of materials previously referred to, and in accordance with the results desired and the application to which the clutch may be put. The composite member 39, of course, will be suitably attached to the member 35, as will the insulating liner 38.

A disc 43 of any conducting material is provided with a hub 44 keyed to the output shaft 45 that is suitably mounted in alignment with shaft 36. A relatively thin, flexible portion 46 of disc 43 extends between the hub 44 and an annular portion 47 of the disc 43. The annular portion 47 is spaced a very slight distance from the outer surface 41 of the composite member 39 in the order of about one or two thousandths of an inch.

An insulating ring 48 is attached to the member 35 and supports an annular conductor 49 adapted to contact a brush 50 so that electric charges can be supplied to the ring 49 while the member 35 is moving. The member 35 is provided with a bore 51 and includes an insulating sleeve 52 extending from the insulating liner 38 to the insulating ring 48. A conductor 53 extends from the current-carrying ring 49 in the insulating annular ring 48 through the sleeve 52 to the rear surface 42 of the composite member 39 to which it makes electrical contact.

A slip ring 54 is integrally attached to the hub 44 of the disc 43 and engages a brush 55 that is connected through a conductor 56 to the one side of a power pack 57, the conductor 56 and the pack 57 being grounded at 58. The brush 50 is electrically connected to the high voltage side of the power pack 57, and alternating current is supplied to the power pack 57 through the lines $L_1$ and $L_2$, and a relay 59. The power pack 57 is substantially of the same type as that shown at 29 in Fig. 5, providing electric charges to the back surface 42 of the composite member 39 and the disc 43.

With the input shaft 36 rotating, and the relay 59 open, the output shaft 45 remains at rest. Upon closing the switch 59, electrostatic attraction is created between the composite member 39 and the disc 43, thereby drawing the latter into intimate contact with the outer surface 41 of the composite member 39, whereupon the rotation of shaft 36 is transmitted to the output shaft 45. Opening the relay 59 removes the source of electric charges between the composite member 39 and the disc 43, whereupon the flexible nature of the portion 46 of the disc 43 separates the portion 47 thereof from the surface 41 of the composite member 39.

It is obviously within the scope of the above disclosure to utilize substantially the same mechanism for a brake. In such an instance the member 35 will be rigidly attached to a stationary frame member, and the brush 50 and collector ring 49 may be eliminated and conductor 53 extend directly to the power pack 57.

Figure 7:
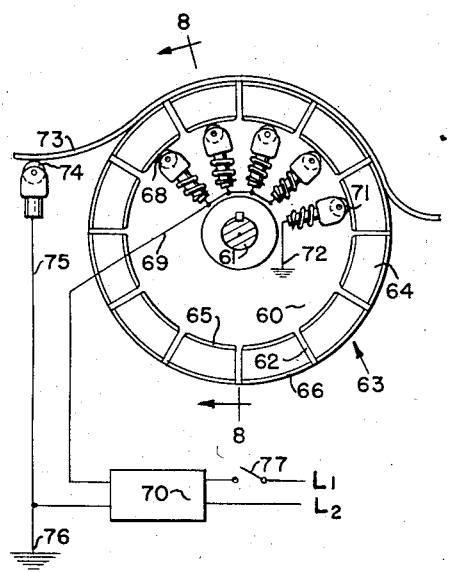
Fig. 7 is an end view of a conveying mechanism to which the principles of the invention have been applied.
Figure 8:
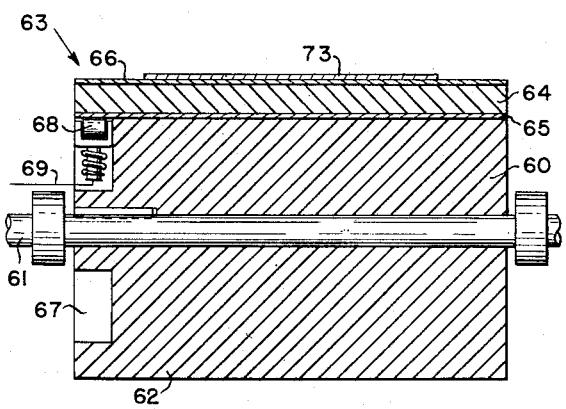
Fig. 8 is a sectional elevation of the mechanism of Fig. 7 taken along the line 8—8.

Referring to Figs. 7 and 8 in which is disclosed a rotatable conveyor apparatus embodying the principles of the invention, a cylindrical body 60 of insulating material is keyed to a driving shaft 61. The insulating body 60 may be of any of the well-known structural electrical insulating materials. The outer surface of the insulating member 60 is in the form of insulating axial ribs 62 equally spaced about the periphery of the member 60. Between the ribs 62 are located arcuate sectional members 63 formed of a composite construction including an intermediate element 64 made of one of the semiconducting compositions previously referred to and having an electrical characteristic of a volume resistivity between the limits of $10^2$ to $10^{10}$ ohm centimeters. Each of the elements 64 is provided with an inner coating 65 of one of the materials having a resistivity less than $10^2$ ohm centimeters, and an outer relatively thin layer 66 of material selected from the category of those previously described having a volume resistivity in excess of $10^{10}$ ohm centimeters. Each of the arcuate composite members 63 is rigidly fixed to the insulating body member 60 in a manner to form a unitary structure adapted to be rotated by the drive shaft 61. The layer 66 of the composite members 63 may be confined to the surface of the members 63, or it may be continuous, bridging the ribs 62.

The one end of the assembly may be recessed at 67 in a manner to receive a current-distributing apparatus schematically shown as individual rollers 68 resiliently urged into contact with the relatively thin surface 65 of the arcuate members 63. In this connection, the relatively thin surface 65 must be selected from materials which will provide good conduction and resist wear between the rolling action of the rollers 68; or wear-resistant conducting arcuate segments may be added against which the rollers 68 ride in order to prevent deterioration of the relatively thin surface 65 of the composite members 63.

It will be noted that the rollers 68 are applied to only a few of the members 63 and these rollers are all connected to a common conductor 69 leading to one side of a power pack 70. The power pack 70 is generally of the same design as that employed in the apparatus shown in Figs. 5 and 6. An additional roller 71 is provided to contact the segments 63 as they pass it, and this roller 71 is connected to ground at 72. A conveyor belt, or conducting material 73 adapted to be conveyed by the apparatus, rests on the outer periphery of the unitary rotatable structure and is in contact with members 63 that in turn are in contact with the rollers 68. An idler pulley 74 contacts the belt or conducting material 73, and itself is connected to a conductor 75 that leads to a ground connection 76, as well as to the power supply 70. Alternating current is supplied to the power pack 70 from lines $L_1$ and $L_2$ in the usual manner and an on-off switch 77, or other voltage control means, is provided for controlling the operation of the conveying apparatus by an operator.

With the apparatus in the condition as shown in Figs. 7 and 8, the belt or material 73 is at ground potential. Closing the switch 77 provides electric charges to the rollers 68 and hence to the inner surfaces 65 of those members 63 that are in contact with the belt or material 73, whereupon an electrostatic force is created between the belt or material 73 and the members 63 that are in contact with the rollers 68. Accordingly, clockwise rotation of the unitary assembly causes the belt 73 to be moved rightwardly (Fig. 7). As each member 63 passes from contact with the rightmost roller 68, it contacts the roller 71, thereby grounding said member. Accordingly, the charges on the member 63 are discharged and no attractive force is present between it and the belt or material 73. Opening switch 77 at any time removes the source of power, and the only charges remaining between the belt 73 and the members 63 in contact with rollers 68 are residual charges which are removed during the next succeeding revolution of the unitary assembly as each member 63 contacts the grounded roller 71.

The previously described conveying apparatus shown in Figs. 7 and 8 has particular advantage in the conveying of conducting sheets since a relatively large area of the sheet is provided with an equal attractive force distributed thereover which will permit substantial forces being applied to the strip in conveying it, as distinguished from the high unit force inherent in such structures where a thin sheet of material passes between two rollers, making line contact therewith. It is, of course, within the scope of the disclosure of Figs. 7 and 8 to employ an endless belt of conducting material connected to the grounded side of the power pack and which is resiliently urged against, say, a non-conducting, relatively thin strip of material desired to be conveyed. The endless belt is electrostatically forced into contact with the non-conducting strip lying over a portion of the surface of the main rotating assembly, and the thin, non-conducting strip being conveyed may then take the place of the relatively thin surface 66 of a resistivity in excess of $10^{10}$ ohm centimeters.

Figure 9:
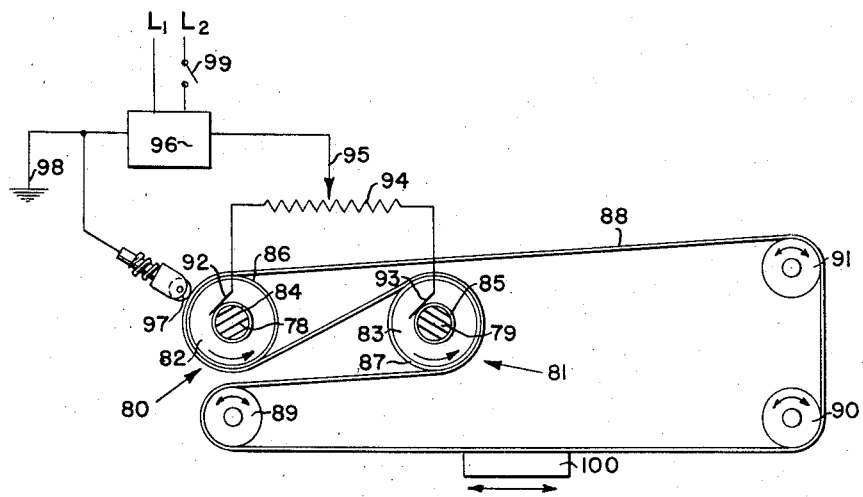
Fig. 9 is a schematic representation showing a servomechanism embodying the principles of the invention.

Referring to Fig. 9 in which is disclosed a schematic showing of a servo-mechanism embodying the principles of the invention, two power-supplying shafts 78 and 79, which may be of insulating material or at least insulated from the mechanism to be described, as well as supporting bearings therefor, support rotatable drum mechanisms 80 and 81. The drums 80 and 81 are composite members made up of tubular elements 82 and 83 of a semiconducting material having a volume resistivity between the limits of $10^2$ and $10^{10}$ ohm centimeters. The inner peripheral surface of the elements 82 and 83 have intimately and permanently attached to them, layers 84 and 85 of one of the materials having a resistivity less than $10^2$ ohm centimeters. The outer peripheral surfaces of the elements 82 and 83 are provided with relatively thin layers 86 and 87 of a material having a volume resistivity in excess of $10^{10}$ ohm centimeters. Accordingly, these composite members have the characteristics of the composite members 12, 39 and 63 of Figs. 5, 6 and 7. The composite members 80 and 81 are adapted to be rotated in the same direction. An endless belt 88 is adapted to surround a portion of each of the members 80 and 81 in a reverse relation and also to surround idler pulleys 89, 90 and 91. Electrical contact brushes 92 and 93 are connected to the opposite ends of a potentiometer 94, and these brushes electrically contact the layers 84 and 85 of the members 80 and 81. The contact arm 95 of the potentiometer 94 is electrically connected to one side of a power pack 96 having the same general characteristics of the power pack 70 of Fig. 7. The opposite side of the power pack 96 is electrically connected to an idler pulley 97 that rides in contact with the endless belt 88, which latter is of a conducting material, either magnetic or non-magnetic. The idler 97 is also connected to a ground 98.

Alternating current is adapted to be supplied to power pack 96 through the usual lines $L_1$ and $L_2$, and an on-off switch 99 is provided for control by the operator. With the apparatus in the condition shown in Fig. 9, and the arm 95 in the central position of the potentiometer 94, equal values of charge are supplied to the elements 84 and 85 through the brushes 92 and 93 while the conducting belt 88 is grounded. Accordingly, as the shafts 78 and 79 are rotated in the same direction, the endless belt 88 slides over the outer periphery of the composite members 80 and 81 so that a load 100 attached to the endless belt 88 does not move. Movement of the potentiometer arm 95 to the right (Fig. 9) raises the charge applied to the element 85 of the member 81 and reduces the charge applied to the element 84 of the member 80 so that greater electrostatic forces are generated between the member 81 and the endless belt 88, and lower electrostatic forces are generated between the member 80 and the endless belt 88, thereby causing the load 100 to move leftwardly. When the load 100 has become repositioned, or satisfied the demands of the apparatus, means of usual form (not shown) may cause the potentiometer to centralize itself, whereupon the voltages and consequently the forces between the member 81 and belt 88, and those between member 80 and belt 88 become equalized and the load remains in its adjusted position, while the members 80 and 81 continue to rotate.

Any of the usual systems of servo-feedback may be used to control the position of the potentiometer arm 95 and, consequently, the position of the load 100.

It is, of course, within the scope of this disclosure to substitute a single-pole, double-throw switch for the potentiometer 94, 95, in which case the maximum force is selectively instantly available at either of the members 80 or 81.

The method of this invention contemplates, as one of the essential steps thereof, that of supplying at the interface between a conducting object and a semiconductor thermal energy in addition to that incident to the normal operation of electrostatic force-producing apparatus to which the principles of this invention are applied.

This step may be achieved by any one or combination of the basic methods of thermal energy transfer. Thus, a beam of radiant energy can be directed onto the conducting object and/or the object-supporting surface of the semiconductor. Apparatus for accomplishing such a step would merely involve an infrared or other radiant-energy beam-producing apparatus arranged such that its effective rays fall on the surfaces or bodies between which the interface is to be maintained at a temperature above ambient.

Again, a stream of fluid having a temperature above ambient can be directed onto said conducting object and/or the object-contacting surface of the semiconductor. Apparatus capable of achieving this result would simply involve a supply of such fluid, at the proper temperature, and connected to a nozzle directed toward the parts making up the interface desired to be treated.

While one of the essential steps of this method can be achieved by any of the above thermal energy transfer means, or a combination thereof, the apparatus chosen to illustrate the method of this invention comprises an electrical resistance heater in combination with the semiconductor, thereby achieving the desired results by conduction. Obviously, it may be expeditious to employ all three of the above recited basic methods of thermal energy transfer in combination, and/or to use the radiant or convection thermal energy transfer means to maintain the conducting object at a temperature above ambient.

Although the principles of the invention may be applied with equal facility to any type of electrostatic holding apparatus, i.e., the various species shown, described and claimed herein as well as other types, they are shown and will be described specifically as applied to an electrostatic chuck.

Referring to the drawing, the principles of the invention are shown as applied to a chuck comprising a base 110 that is shown as a flat plate 111 to which an upright housing 112 is rigidly fixed by screws 113. A series of insulating plugs 114 is arranged on the top surface of the plate 111 and they support a resistance heating element 115 in spaced relation to the plate 111 and the walls of the housing 112. While the resistance heating element 115 may be of any one of many commercial types, it is shown as a glass plate having a resistance circuit 116 (Fig. 10) painted on its under surface across which line voltage is adapted to be impressed.

A body of semiconducting material 117, having a volume resistivity of between substantially $10^2$ and $10^{10}$ ohm centimeters, is mounted on top of the glass resistance heater 115. A layer of conducting material 118, having a volume resistivity less than substantially $10^2$ ohm centimeters, is permanently attached to the lower surface of the semiconductor 115 in contact with the glass upper portion of the resistance heater 115 thereby being effectively insulated from the actual resistance circuit 116.

The semiconductor 117 may be any material, one of the electrical characteristics of which is that its resistivity is within the range of substantially $10^2$ to $10^{10}$ ohm centimeters. Such natural materials as limestone or slate, or any of many conducting materials that have been degraded toward an insulator, or insulating materials degraded toward a conductor, fall within this classification.

The layer 118 of conducting material may be any conductor and of any thickness, but is shown in the present embodiment as being a relatively thin, metallic film that can intimately and permanently be attached to the lower surface of the semi-conductor 117, and may include any of the materials referred to herein.

In order to hold the assembly together, and to provide an hermetical seal between the outer work-supporting surface of the semiconductor 117 and the inside of the housing 112, the semiconductor is provided with a peripheral shoulder 119 adapted to support a flexible insulating gasket 120. The cross-section of the gasket 120 is L-shaped, and the top, peripheral edge of the housing 112 extends inwardly to form a peripheral seal with the gasket 120. The various elements including the semiconductor 117, the resistance heater 115 and the plate 111 are adapted to be held in fixed relative position by the bolts 113, through the cooperation of the returned edge of the housing 112, the gasket 120 and the shoulder 119 of the semiconductor.

A conductor 121 extends outwardly over the work-supporting surface of the semiconductor 117, and it is fixed to the housing 112, which latter is at ground potential as will be described later. While only one conductor 121 is shown, others may be employed in such manner that the placing of a work piece W, regardless of size and where placed, on the semiconductor 117 will contact at least one of the conductors 121.

It is to be understood that a relatively thin layer of a material having a volume resistivity in excess of that of the semiconductor 117 may be provided at the interface between the work-supporting surface of the semiconductor and the conducting work piece. This material may be any of those referred to, and applied in the same manner as those shown and previously described herein.

Referring to Fig. 14, a power pack 122, similar to that shown in Fig. 5, is supplied with line voltage and is of the type that includes a transformer combined with a rectifier and filter to produce a direct current output of between several hundred to several thousand volts. The high voltage output terminal of the power pack 122 is connected to the conducting layer 118 by a conductor 123, while the other output terminal of said power pack is connected to ground by a conductor 124.

The resistance heater 115 is connected across lines 125 and 126 leading from the alternating current supply. A switch 127 is connected in series in the line 125 and a line 128 leads from the one side of the switch 127 to the power pack 122. An indicating lamp 129 is connected across line 128 and line 126. This arrangement insures the heater 115 working at all times when A.C. voltage is applied across lines 125 and 126, whereas the signal light 129 lights only when the power pack 122 is energized.

Referring to Fig. 13, a terminal block 130 is provided in the one end wall of the housing 112 to which a sheathed cable containing line 123 is connected. A threeway terminal block 131 is also provided in the end wall of housing 112 to accommodate lines 125, 126 and 128.

Although the various features of the new and improved electrostatic apparatus have been shown and described to disclose several embodiments of the invention, it will be evident that certain features may be used without others without departing from the principles of the invention.

What is claimed is:

1. Apparatus comprising in combination, a supporting structure; an element comprising a material having a volume resistivity in excess of $10^2$ ohm centimeters mounted on said supporting structure; a layer of material having a volume resistivity less than $10^2$ ohm centimeters intimately and permanently attached to one face of said element; an insulating member between said element and said supporting structure; a power pack adapted to provide substantially equal amounts of electric charge of opposite polarity at its respective poles; means for connecting said power pack and said layer in series relation with a conducting object adapted to be moved relatively to, and in cooperation with said element; and a layer of material having a volume resistivity in excess of that of said first-mentioned material between said object and said first-mentioned material.

2. Apparatus comprising in combination, a supporting structure; an element comprising a material having a volume resistivity in excess of $10^2$ ohm centimeters supported by said supporting structure; a layer of a material having a volume resistivity less than $10^2$ ohm centimeters intimately and permanently attached to one face of said element; a member insulating said element from said supporting structure while exposing at least one face thereof; a power pack adapted to provide substantially equal amounts of electric charge of opposite polarity at its respective poles; means for connecting said power pack and said layer in series relation with a conducting object adapted replaceably to be moved into contact with said element; and a layer of material having a volume resistivity in excess of that of said first-mentioned material between said object and said first-mentioned material.

3. Apparatus comprising in combination, an element comprising a material having a volume resistivity of between $10^2$ to $10^{10}$ ohm centimeters; a layer of material having a volume resistivity less than $10^2$ ohm centimeters intimately and permanently attached to one face of said element; an electrically-conducting object adapted to be moved relatively to another face of said element and into and out of contact therewith; a relatively thin layer of material having a volume resistivity in excess of $10^{10}$ ohm centimeters between said element and said object; a power pack adapted to provide substantially equal amounts of electric charge of opposite polarity at its respective poles; and means for connecting said power pack and said layer having a volume resistivity less than $10^2$ ohm centimeters in series relation with said conducting object.

4. Apparatus comprising in combination, a supporting structure; an element comprising a material having a volume resistivity of between $10^2$ to $10^{10}$ ohm centimeters supported by said supporting structure; a layer of a material having a volume resistivity less than $10^2$ ohm centimeters intimately and permanently attached to one face of said element; a member insulating said element from said supporting structure while exposing at least one face thereof; a conducting object adapted replaceably to be moved into contact with the exposed face of said element; a relatively thin layer of a material having a volume resistivity in excess of $10^{10}$ ohm centimeters between said conducting object and the exposed face of said element; a power pack adapted to provide substantially equal amounts of electric charge of opposite polarity at its respective poles; and means for connecting said power pack and said layer having a volume resistivity less than $10^2$ ohm centimeters in series relation with said object.

5. The method of producing electrostatic forces of relatively high intensity which comprises providing electric charges of one polarity upon a member made from a material having a volume resistivity between the limits of $10^2$ to $10^{10}$ ohm centimeters to which is permanently attached a layer of a material having a volume resistivity less than $10^2$ ohm centimeters, and providing electric charges of opposite polarity upon an electrically-conducting object; and providing a relatively thin layer of a material having a volume resistivity in excess of $10^{10}$ ohm centimeters between said conducting object and said member.

6. An electrostatic chuck comprising in combination, a base; a member comprising a material having a volume resistivity in excess of $10^2$ ohm centimeters supported by said base; a layer of material having a volume resistivity less than $10^2$ ohm centimeters intimately and permanently attached to one face of said member; means for insulating said member from said base while exposing at least one face thereof other than the one to which said layer of material is attached; a power pack adapted to provide substantially equal amounts of electric charge of opposite polarity at its respective poles; a conductor for connecting the layer of material to one side of said power pack; means for providing a ground connection for said power pack and adapted to contact an electrically-conducting object placed on said chuck; and a layer of material having a volume resistivity in excess of that of said first-mentioned material between said object and said first-mentioned material.

7. An electrostatic chuck comprising in combination, a base; a member comprising a material having a volume resistivity in excess of $10^2$ ohm centimeters supported by said base; a layer of material having a volume resistivity less than $10^2$ ohm centimeters intimately and permanently attached to one face of said member; means for insulating said member from said base while exposing at least one face thereof other than the face to which said layer is attached; a power pack adapted to provide substantially equal amounts of electric charge of opposite polarity at its respective poles; a conductor adapted to connect one side of said power pack to the layer of material; means for grounding said base and the opposite side of said power pack; means for interrupting the circuit from said power pack to said layer of material until an electrically-conducting object is placed on said chuck; and a layer of material having a volume resistivity in excess of that of said first-mentioned material between said object and said first-mentioned material.

8. An electrostatic chuck comprising in combination, a base; a member comprising a material having a volume resistivity in excess of $10^2$ ohm centimeters supported by said base; a layer of material having a volume resistivity less than $10^2$ ohm centimeters intimately and permanently attached to one face of said member; means for insulating said member from said base while exposing at least one face thereof other than the face to which said layer of material is attached; a power pack adapted to provide substantially equal amounts of electric charge of opposite polarity at its respective poles; means for connecting one side of said power pack to said layer of material; means for grounding the opposite side of said power pack as well as said base; means for grounding said layer of material when no conducting object is in contact with said chuck, and for establishing the circuit from said one side of said power pack to said layer of material when a conducting object is placed in contact with said chuck; and a layer of material having a volume resistivity in excess of that of said first-mentioned material between said object and said first-mentioned material.

9. An electrostatic chuck comprising in combination, a base; a member comprising a material having a volume resistivity of between $10^2$ to $10^{10}$ ohm centimeters supported by said base; a layer of material having a volume resistivity less than $10^2$ ohm centimeters intimately and permanently attached to one face of said member; means for insulating said member from said base while exposing at least one face thereof; a relatively thin layer of material having a volume resistivity in excess of $10^{10}$ ohm centimeters applied to said exposed face; a power pack adapted to provide substantially equal amounts of electric charge of opposite polarity at its respective poles; a conductor leading from one side of said power pack to said layer of material having a volume resistivity less than $10^2$ ohm centimeters; means for grounding the opposite side of said power pack as well as said base; and means for establishing an electric circuit between said one side of said power pack and said layer of material having a volume resistivity of less than $10^2$ ohm centimeters only when an electrically-conducting object is placed on said chuck.

10. An electrostatic chuck comprising in combination, a base; a member formed from a material having a volume resistivity of between $10^2$ to $10^{10}$ ohm centimeters supported by said base; a layer of material having a volume resistivity less than $10^2$ ohm centimeters intimately and permanently attached to said member; means for insulating said member from said base while exposing at least one face thereof other than the face to which said layer of material is attached; a relatively thin layer of material having a volume resistivity in excess of $10^{10}$ ohm centimeters applied to said exposed face of said member; a power pack adapted to provide substantially equal amounts of electric charge of opposite polarity at its respective poles; and means for connecting said power pack and said layer of material having a volume resistivity less than $10^2$ ohm centimeters in series relation with a conducting object adapted replaceably to be applied to said exposed surface.

11. An electrostatic chuck comprising in combination, a base; a member formed from a material having a volume resistivity of between $10^2$ to $10^{10}$ ohm centimeters supported by said base; a layer of material having a volume resistivity less than $10^2$ ohm centimeters intimately and permanently attached to said member; means for insulating said member from said base while exposing at least one face thereof other than the face to which said layer of material is attached; a power pack adapted to provide substantially equal amounts of electric charge of opposite polarity at its respective poles; means for connecting said power pack and said layer of material having a volume resistivity less than $10^2$ ohm centimeters in series with a conducting object adapted replaceably to be applied to said exposed surface; and a relatively thin layer of material having a volume resistivity in excess of $10^{10}$ ohm centimeters between said exposed face of said member and said conducting object.

12. The method of holding electrically-conducting material which comprises providing electric charges of one polarity upon a member having front and back faces and comprising a material having a volume resistivity between $10^2$ to $10^{10}$ ohm centimeters to which a layer of material having a volume resistivity less than $10^2$ ohm centimeters has been applied to its back face, providing electric charges of opposite polarity upon an electrically-conducting object resting on the front face of said member; and providing a relatively thin layer of a material having a volume resistivity in excess of $10^{10}$ ohm centimeters between said object and said member.

13. Apparatus comprising in combination, a pair of members; means providing relative movement between said members; means for bringing said members into contact with each other to cause one of the members to assume the condition of the other, said means comprising an element mounted on one of said members and having a volume resistivity of between $10^2$ to $10^{10}$ ohm centimeters; a layer of material having a volume resistivity of less than $10^2$ ohm centimeters intimately and permanently attached to an unexposed face of said element; the other of said members comprising an electrically-conducting element in closely spaced relation with an exposed face of said element having a volume resistivity between $10^2$ and $10^{10}$ ohm centimeters; a relatively thin layer of material having a volume resistivity in excess of $10^{10}$ ohm centimeters between said element having a volume resistivity between $10^2$ and $10^{10}$ ohm centimeters and said conducting element; and a power pack adapted to provide substantially equal amounts of electric charge of opposite polarity at its respective poles connected in series relation with said unexposed face of said element having a volume resistivity of between $10^2$ and $10^{10}$ ohm centimeters and said electrically-conducting element.

14. Apparatus comprising in combination, a pair of members; means for providing relative rotary movement between said members; means for bringing said members into contact with each other to cause one of the members to assume the condition of the other, said means comprising an element mounted on one of said members and having a volume resistivity of between $10^2$ to $10^{10}$ ohm centimeters; a layer of material having a volume resistivity of less than $10^2$ ohm centimeters intimately and permanently attached to a face of said element; means for insulating said one of said members from said element; the other of said members comprising a conducting element in closely spaced relation with an exposed face of said element having a volume resistivity between $10^2$ and $10^{10}$ ohm centimeters; a power pack adapted to provide substantially equal amounts of electric charge of opposite polarity at its respective poles; and means for connecting said power pack and said layer in series relation with said conducting element.

15. Apparatus comprising in combination, a pair of members; means for providing relative movement between said members; means for bringing said members into contact with each other to cause one of the members to assume the condition of the other, said means comprising an element mounted on one of the members and having a volume resistivity of between $10^2$ and $10^{10}$ ohm centimeters; a layer of material having a volume resistivity of less than $10^2$ ohm centimeters intimately and permanently attached to a face of said element; means for insulating said one of said members from said element; the other of said members comprising a conducting element spaced a relatively small distance from an exposed face of said element; a relatively thin layer of a material having a volume resistivity greater than $10^{10}$ ohm centimeters between said elements; a power pack adapted to provide substantially equal amounts of electric charge of opposite polarity at its respective poles; means for connecting one side of said power pack to the layer of material having a volume resistivity less than $10^2$ ohm centimeters; and means for connecting the opposite side of said power pack to said connecting element as well as to ground.

16. An electrostatic clutch comprising in combination, a power input shaft; a clutch element connected to said power input shaft; a disc mounted upon one face of said clutch element, said disc being made from a material having a volume resistivity of between $10^2$ to $10^{10}$ ohm centimeters; a layer of material having a volume resistivity less than $10^2$ ohm centimeters intimately and permanently attached to one face of said disc; means for insulating said disc while exposing at least one face thereof, said insulating means and said disc being rigidly fixed to the clutch element; a power output shaft; a second clutch element fixed to said power output shaft, said second clutch element being provided with a portion of electrically-conducting material spaced a relatively short distance from the exposed face of said disc; flexible means between said portion and said output shaft; and a power pack adapted to provide substantially equal amounts of electric charge of opposite polarity at its respective poles connected in series relation with said layer on the disc fixed to said first clutch element and the electrically-conducting portion of said second clutch element.

17. An electrostatic clutch comprising in combination, an input shaft; a first clutch element fixed to said input shaft; a member fixed to said first clutch element and being made from a material having a volume resistivity of between $10^2$ and $10^{10}$ ohm centimeters; a layer of material having a volume resistivity less than $10^2$ ohm centimeters intimately and permanently attached to one face of said member; an output shaft; a second clutch element fixed to said output shaft, and including a portion formed from conducting material; a flexible connection between said conducting portion and said output shaft, said conducting portion being spaced a relatively small distance from an exposed face of said member attached to said first clutch element; a relatively thin layer of material having a volume resistivity in excess of $10^{10}$ ohm centimeters between said member and said second clutch element; a power pack adapted to provide substantially equal amounts of electric charge of opposite polarity at its respective poles; means for connecting one pole of said power pack to said layer on said member; and means for connecting the opposite pole of said power pack to said conducting portion of said second clutch element as well as to ground.

18. Apparatus comprising in combination, a pair of members; means for providing relative movement between said members; means for bringing said members into contact with each other to cause one of the members to assume the condition of the other, said means comprising an element mounted on one of said members and having a volume resistivity of between $10^2$ to $10^{10}$ ohm centimeters; a layer of material having a volume resistivity of less than $10^2$ ohm centimeters intimately and permanently attached to a face of said element; the other of said members comprising an electrically-conducting element; a relatively thin layer of material having a volume resistivity in excess of $10^{10}$ ohm centimeters between said elements; the construction and arrangement of the parts being such that a relatively small air gap exists between the elements; and a power pack adapted to provide substantially equal amounts of electric charge of opposite polarity at its respective poles connected in series relation with said elements.

19. Apparatus comprising in combination, a pair of members; means for providing relative movement between said members; means for bringing said members into contact with each other to cause one of the members to assume the condition of the other, said means comprising an element mounted on one of said members and having a volume resistivity of between $10^2$ to $10^{10}$ ohm centimeters; a layer of material having a volume resistivity less than $10^2$ ohm centimeters intimately and permanently attached to a face of said element; means for insulating said element while exposing at least one face thereof; the other of said members comprising an electrically-conducting element; a relatively thin layer of material having a volume resistivity in excess of $10^{10}$ ohm centimeters between said elements, the construction and arrangement of the parts being such that a relatively small air gap exists between said elements; a power pack adapted to provide substantially equal amounts of electric charge of opposite polarity at its respective poles; and means for connecting said power pack and said layer of material having a volume resistivity less than $10^2$ ohm centimeters in series relation with said electrically-conducting element.

20. An article of manufacture having at least two surfaces for use with an electrostatic apparatus comprising an insulating material combined with an electronically-conducting material and having a volume resistivity progressively increasing from a value less than $10^2$ ohm centimeters at its one surface to a value in excess of $10^{10}$ ohm centimeters at its other surface.

21. Apparatus for continuously translating a sheet of material comprising in combination, a rotatable member of substantially tubular form and having a volume resistivity of between $10^2$ and $10^{10}$ ohm centimeters; a layer of a material having a volume resistivity less than $10^2$ ohm centimeters intimately and permanently attached to the inner peripheral surface of said tubular member; a power pack adapted to provide substantially equal amounts of electric charge of opposite polarity at its respective poles; and means for connecting said power pack and said rotatable member in series relation with an electrically-conducting object in contact with said sheet.

22. Apparatus for translating a sheet of material comprising in combination, a rotatable member of substantially tubular form made up of separate stave-like elements arranged in a circle and comprising material having a volume resistivity between the limits of $10^2$ to $10^{10}$ ohm centimeters; insulation means between the stave-like elements and between all of them and a rotatable shaft; a layer of material having a resistivity less than $10^2$ ohm centimeters intimately and permanently attached to the inner surfaces of each of the stave-like elements; a power pack adapted to provide substantially equal amounts of electric charge of opposite polarity at its respective poles; and means for successively connecting said power pack and certain of said stave-like elements in series relation with an electrically-conducting object in contact with said sheet.

23. Apparatus for continuously translating a sheet of electrically-conducting material comprising in combination, a rotatable member of substantially tubular form and having a volume resistivity of between $10^2$ and $10^{10}$ ohm centimeters; a layer of material having a volume resistivity less than $10^2$ ohm centimeters intimately and permanently attached to the inner peripheral surface of said tubular member; a power pack adapted to provide substantially equal amounts of electric charge of opposite polarity at its respective poles; and means for connecting said power pack and said rotatable member in series relation with said sheet of electrically-conducting material, while the latter is in contact with a peripheral portion of said rotatable member.

24. Apparatus for translating a sheet of electrically-conducting material comprising in combination, a rotatable member of substantially tubular form having a plurality of stave-like elements arranged in a circle and each of which is formed from a material having a volume resistivity of between $10^2$ and $10^{10}$ ohm centimeters; a layer of material having a volume resistivity less than $10^2$ ohm centimeters intimately and permanently attached to the inner surface of each of said stave-like elements; insulating means between each of said stave-like elements as well as between all of said stave-like elements and a rotatable shaft adapted to support said rotatable member; a power pack adapted to provide substantially equal amounts of electric charge of opposite polarity at its respective poles; and means for connecting said power pack and said rotatable member in series relation with said sheet of electrically-conducting material, while the latter is in cooperating position with the outer peripheral surface of said rotatable member.

25. Apparatus for translating a sheet of material comprising in combination, a rotatable member of substantially tubular form made up of a plurality of stave-like elements arranged in a circle and having a volume resistivity of between $10^2$ and $10^{10}$ ohm centimeters; a layer of material having a volume resistivity less than $10^2$ ohm centimeters intimately and permanently attached to the inner peripheral surface of each of said stave-like elements; insulation means between each of said stave-like elements and between all of said stave-like elements and a rotatable shaft adapted to support said elements; a power pack adapted to provide substantially equal amounts of electric charge of opposite polarity at its respective poles; means for connecting said power pack and successive of said stave-like elements in series relation with an electrically-conducting object in contact with said sheet; and means following said last-mentioned means for connecting successive of said stave-like elements to ground as said rotatable member rotates.

26. Apparatus for translating a sheet of electrically-conducting material comprising in combination, a rotatable member of substantially tubular form including a plurality of stave-like elements having a volume resistivity of between $10^2$ and $10^{10}$ ohm centimeters; a layer of a material having a volume resistivity less than $10^2$ ohm centimeters intimately and permanently attached to the inner surface of each of said stave-like elements; insulation means between each of said stave-like elements and all of said stave-like elements and a rotatable shaft adapted to support said elements; a power pack adapted to provide substantially equal amounts of electric charge of opposite polarity at its respective poles; contact-making means in engagement with a plurality of said stave-like elements, said contact-making means being mounted on a stationary support; means for connecting said contact-making means to one pole of said power pack; grounded contact-making means located in position following said other contact-making means and adapted to ground successive stave-like elements as they pass said last-mentioned contact-making means during the rotation of said rotatable member; and means for connecting the opposite pole of said power pack to said sheet of electrically-conducting material as well as to ground.

27. Apparatus for translating a sheet of material comprising in combination, a rotatable member of substantially tubular form and having a volume resistivity of between $10^2$ and $10^{10}$ ohm centimeters; a layer of a material having a volume resistivity less than $10^2$ ohm centimeters intimately and permanently attached to the inner peripheral surface of said tubular member; an electrically-conducting object adapted to cooperate with said sheet; a relatively thin layer of material having a volume resistivity in excess of $10^{10}$ ohm centimeters between said sheet and the outer peripheral surface of said rotatable member; a power pack adapted to provide substantially equal amounts of electric charge of opposite polarity at its respective poles; and means for connecting said power pack and said rotatable member in series relation with said electrically-conducting object.

28. Apparatus for translating a sheet of electrically-conducting material comprising in combination, a rotatable member of substantially tubular form having a volume resistivity of between $10^2$ and $10^{10}$ ohm centimeters; a layer of a material having a volume resistivity less than $10^2$ ohm centimeters intimately and permanently attached to the inner peripheral surface of said tubular member; a relatively thin layer of material having a volume resistivity greater than $10^{10}$ ohm centimeters between the outer peripheral surface of the rotatable member and said sheet of conducting material, which latter lies in cooperating position relatively to a peripheral portion of said rotatable member; a power pack adapted to provide substantially equal amounts of electric charge of opposite polarity at its respective poles; and means for connecting said power pack and said rotatable member in series relation with said sheet of electrically-conducting material.

29. Apparatus for translating a sheet of electrically-conducting material comprising in combination, a rotatable member of substantially tubular form having a plurality of stave-like portions arranged in a circuit and formed from a material having a volume resistivity within the limits of $10^2$ to $10^{10}$ ohm centimeters; a layer of material having a volume resistivity less than $10^2$ ohm centimeters intimately and permanently attached to the inner peripheral surface of each of said stave-like elements; insulating means between each of said stave-like elements and between all of said stave-like elements and a rotatable shaft adapted to support said rotatable member; a power pack adapted to provide substantially equal amounts of electric charges; a plurality of contact means located on a stationary support and adapted to contact the inner peripheral surface of a plurality of successive of said stave-like elements as the same pass said stationary contact means during the rotation of said rotatable member; means for connecting one pole of said power pack to said contact means; an additional contact means following said other contact means and connected to a ground, said last-mentioned contact means adapted to contact successive of said stave-like elements as they pass it during the rotation of said rotatable member; a relatively thin layer of material having a volume resistivity in excess of $10^{10}$ ohm centimeters between the outer peripheral surface of said rotatable member and said sheet of electrically-conducting material as the latter lies in cooperating position relatively to a portion of the peripheral surface of said rotatable member; and means for connecting the opposite pole of said power pack to said sheet of electrically-conducting material as well as to ground.

30. Servo-mechanism comprising in combination, a plurality of rotatable tube-like members having a volume resistivity between $10^2$ and $10^{10}$ ohm centimeters; a layer of material having a volume resistivity less than $10^2$ ohm centimeters intimately and permanently attached to the inner peripheral surface of said tube-like members; a band of electrically-conducting material in cooperating relation with the outer peripheral surfaces of said tubular members, the construction and arrangement of the band and tubular members being such that movements of said band in opposite directions can be effected by said rotatable members; a load connected to said band; a power pack adapted to provide substantially equal amounts of electric charge of opposite polarity at its respective poles; means for connecting one pole of said power pack to said tubular members; and means for connecting the opposite pole of said power pack to said electrically-conducting band as well as to ground.

31. Servo-mechanism comprising in combination, a plurality of rotatable tube-like members having a volume resistivity between $10^2$ and $10^{10}$ ohm centimeters; a layer of material having a volume resistivity less than $10^2$ ohm centimeters intimately and permanently attached to the inner peripheral surface of said tube-like members; a band of electrically-conducting material in cooperating relation with the outer peripheral surfaces of said tubular members, the construction and arrangement of the band and tubular members being such that movement of said band in opposite directions can be effected by said rotatable members; a load connected to said band; a power pack adapted to provide substantially equal amounts of electric charge of opposite polarity at its respective poles; means for connecting one pole of said power pack to said tubular members; means for varying the charge applied to each of said rotatable members; and means for connecting the opposite pole of said power pack to said electrically-conducting band as well as to ground.

32. Servo-mechanism comprising in combination, a plurality of rotatable tube-like members having a volume resistivity between $10^2$ and $10^{10}$ ohm centimeters; means for rotating said rotatable members in the same direction; a layer of material having a volume resistivity less than $10^2$ ohm centimeters intimately and permanently attached to the inner peripheral surface of each of said tube-like members; a band of electrically-conducting material in reverse-wound relation about said rotatable members, whereby each of the rotatable members when effective to move said band will cause said band to move in opposite directions; a load connected to said band; a power pack adapted to provide substantially equal amounts of electric charge of opposite polarity at its respective poles; means for connecting one pole of said power pack to said rotatable members; means for varying the charge applied to said rotatable members; and means for connecting the opposite pole of said power pack to the electrically-conducting band as well as to ground.

33. Servo-mechanism comprising in combination, a plurality of rotatable tube-like members having a volume resistivity between $10^2$ and $10^{10}$ ohm centimeters; a layer of material having a volume resistivity less than $10^2$ ohm centimeters intimately and permanently attached to the inner peripheral surface of each of said tube-like members; a band of electrically-conducting material in cooperating relation with the outer peripheral surface of said tubular members, the construction and arrangement of the band and tubular members being such that movements of said band in opposite directions can be effected by said rotatable members; a relatively thin layer of material having a volume resistivity in excess of $10^{10}$ ohm centimeters located between said band of conducting material and the peripheral surface of said rotatable tubular members; a power pack adapted to provide substantially equal amounts of electric charge of opposite polarity at its respective poles; means for connecting one pole of said power pack to said tubular members; and means for connecting the opposite pole of said power pack to said electrically-conducting band as well as to ground.

34. Servo-mechanism comprising in combination, a plurality of rotatable tube-like members having a volume resistivity between $10^2$ and $10^{10}$ ohm centimeters; a layer of material having a volume resistivity less than $10^2$ ohm centimeters intimately and permanently attached to the inner peripheral surface of said tube-like members; a band of electrically-conducting material in cooperating relation with the outer peripheral surface of said tubular members, the construction and arrangement of the band and tubular members being such that movements of said band in opposite directions can be effected by said rotatable members; a load connected to said band; a relatively thin layer of material having a volume resistivity in excess of $10^{10}$ ohm centimeters located between said band of conducting material and said tubular members; a power pack adapted to provide substantially equal amounts of electric charge of opposite polarity at its respective poles; means for connecting one pole of said power pack to said tubular members; means for varying the charge applied to each of said rotatable members relatively to each other; and means for connecting the opposite pole of said power pack to said electrically-conducting band as well as to ground.

35. Servo-mechanism comprising in combination, a plurality of rotatable tube-like members having a volume resistivity of between $10^2$ and $10^{10}$ ohm centimeters; a layer of material having a volume resistivity less than $10^2$ ohm centimeters intimately and permanently attached to the inner peripheral surface of said tube-like members; means for rotating said tube-like members in the same direction; a band of electrically-conducting material reversely wound about said tubular members whereby said band is caused to move in opposite directions when each of the tubular members is effective; a relatively thin layer of material having a volume resistivity in excess of $10^{10}$ ohm centimeters located between said band of conducting material and said tubular members; a load connected to said band; a power pack adapted to provide substantially equal amounts of electric charge of opposite polarity at its respective poles; means for connecting one pole of said power pack to said tubular members; means for varying the charge applied to each of said tubular members; and means for connecting the opposite pole of said power pack to said electrically-conducting band as well as to ground.

36. A composite article of manufacture for use with an electrostatic apparatus comprising a laminated structure having more than two laminations wherein successive laminations are formed of materials having increasing values of volume resistivity, said values of resistivity including one of less than $10^2$ ohm centimeters, one between $10^2$ and $10^{10}$ ohm centimeters, and one in excess of $10^{10}$ ohm centimeters.

37. Apparatus comprising in combination, a laminated structure having more than two laminations, where successive laminations are formed from materials having increasing values of volume resistivity including one less than $10^2$ ohm centimeters, one between $10^2$ and $10^{10}$ ohm centimeters, and one greater than $10^{10}$ ohm centimeters; an electrically-conducting object adapted to be moved relatively to, but in cooperation with said laminated structure; a power pack adapted to provide substantially equal amounts of electric charge of opposite polarity at its respective poles; and means for connecting said power pack and the low-resistivity side of said laminated structure in series relation with said electrically-conducting object.

38. An artcle of manufacture having at least two surfaces for use with an electrostatic apparatus comprising a homogeneous structure having a progressively increasing volume resistivity of from less than about $10^2$ ohm centimeters at its one surface to a volume resistivity greater than about $10^{10}$ ohm centimeters at its other surface.

39. Apparatus comprising in combination, a homogeneous structure having at least two surfaces and having a progressively increasing volume resistivity of from less than about $10^2$ ohm centimeters at its one surface to a volume resistivity greater than about $10^{10}$ ohm centimeters at its other surface; an electrically-conducting object adapted to be moved relatively to, but in cooperation with said homogeneous structure; a power pack adapted to provide substantially equal amounts of electric charge of opposite polarity at its respective poles; and means for connecting said power pack and the low resistivity side of said homogeneous structure in series relation with said conducting object.

40. The method of producing electrostatic forces of relatively high intensity, which comprises providing positive or negative electric charges upon a member made from a material having a volume resistivity between the limits of $10^2$ and $10^{10}$ ohm centimeters to which is permanently attached a layer of material having a volume resistivity less than $10^2$ ohm centimeters; providing electric charges of opposite sign upon a conducting object; and providing a relatively thin layer of a material having a volume resistivity in excess of $10^{10}$ ohm centimeters between said conducting object and said member.

41. In an electrostatic apparatus, a semiconducting material having a volume resistivity of a value in excess of $10^2$ ohm centimeters but less than $10^{10}$ ohm centimeters; a material on one surface of said semiconducting material having a volume resistivity less than $10^2$ ohm centimeters; an electrically-conducting object in cooperating position relatively to another surface of said semiconducting material; and a layer of material between said object and said semiconducting material having a volume resistivity in excess of that of said semiconducting material.

42. A composite article of manufacture for use with an electrostatic apparatus comprising a medial portion having a volume resistivity in excess of $10^2$ ohm centimeters but less than $10^{10}$ ohm centimeters; a terminal portion having a volume resistivity less than $10^2$ ohm centimeters; and another terminal portion having a volume resistivity in excess of that of said medial portion.

43. The method of producing electrostatic forces of relatively high intensity which comprises providing electric charges of one polarity upon a member made from a material having a volume resistivity between the limits of substantially $10^2$ to $10^{10}$ ohm centimeters to which is permanently attached a layer of a material having a volume resistivity less than $10^2$ ohm centimeters, and providing electric charges of opposite polarity upon a conducting object; and providing thermal energy at the interface between said conducting object and the material having a volume resistivity between the limits of substantially $10^2$ to $10^{10}$ ohm centimeters sufficient to maintain said interface above ambient, and which energy is in addition to that incident to the provision of said electric charges.

44. The method of producing electrostatic forces of relatively high intensity which comprises providing electric charges of one polarity upon a semiconducting member made from a material having a volume resistivity between the limits of substantially $10^2$ to $10^{10}$ ohm centimeters to which is permanently attached a layer of a material having a volume resistivity less than $10^2$ ohm centimeters, and providing electric charges of opposite polarity upon a conducting object; providing a relatvely thin layer of a material having a volume resistivity in excess of substantially $10^{10}$ ohm centimeters between said conductmg object and said semiconducting member; and providing thermal energy at the interfaces between said conductmg object and said semiconducting body sufficient to maintain said interface above ambient, and which energy is in addition to that incident to the provision of said electric charges.

45. The method of holding a conducting material which comprises providing electric charges of one polarity upon a semiconductor made from a material having a volume resistivity between substantially $10^2$ to $10^{10}$ ohm centimeters to which a layer of a material having a volume resistivity less than $10^2$ ohm centimeters has been applied to its back face, and providing electric charges of opposite polarity upon a conducting object at its front face; and providing at the interface between said conducting object and said semiconductor thermal energy sufficient to maintain said interface above ambient, and which energy is in addition to that incident to the provision of said electric charges.

46. The method of holding a conducting material which comprises providing electric charges of one polarity upon a semiconducting member made from a material having a volume resistivity between substantially $10^2$ to $10^{10}$ ohm centimeters to which a layer of material having a volume resistivity less than $10^2$ ohm centimeters has been applied to its back face, and providing electric charges of opposite polarity upon a conducting object at its front face; providing a relatively thin layer of a material having a volume resistivity in excess of $10^{10}$ ohm centimeters between said object and said semiconducting member; and providing at the interfaces between said conducting object and said semiconductor, thermal energy sufficient to maintain said interface above ambient, and which energy is in addition to that incident to the provision of said electric charges.

47. The method of producing electrostatic forces of relatively high intensity which comprises providing electric charges of one polarity upon a semiconducting member made from a material having a volume resistivity between the limits of substantially $10^2$ to $10^{10}$ ohm centimeters to which is permanently attached a layer of a material having a volume resistivity less than $10^2$ ohm centimeters, and providing electric charges of opposite polarity upon a conducting object; providing a relatively thin layer of a material having a volume resistivity in excess of $10^{10}$ ohm centimeters between said conducting object and said semiconducting member; and directing a beam of radiant energy on the object-supporting surface of said semiconductor of sufficient intensity to maintain said object-supporting surface above ambient.

48. The method of producing electrostatic forces of relatively high intensity which comprises providing electric charges of one polarity upon a semiconducting member made from a material having a volume resistivity between the limits of substantially $10^2$ to $10^{10}$ ohm centimeters to which is permanently attached a layer of a material having a volume resistivity less than $10^2$ ohm centimeters, and providing electric charges of opposite polarity upon a conducting object; providing a relatively thin layer of a material having a volume resistivity in excess of $10^{10}$ ohm centimeters between said conducting object and said semiconducting member; and directing a stream of fluid having a temperature above ambient onto said object-contacting surface of said semiconducting member.

49. The method of producing electrostatic forces of relatively high intensity which comprises providing electric charges of one polarity upon a semiconducting member made from a material having a volume resistivity between the limits of substantially $10^2$ to $10^{10}$ ohm centimeters to which is permanently attached a layer of a material having a volume resistivity less than $10^2$ ohm centimeters, and providing electric charges of opposite polarity upon a conducting object; supplying thermal energy to the object-contacting surface of said semiconducting member sufficient to maintain said object-contacting surface above ambient, and which energy is in addition to that incident to the provision of said electric charges; and raising the temperature of the conducting object above ambient.

50. The method of producing electrostatic forces of relatively high intensity which comprises providing electric charges of one polarity upon a semiconducting member made from a material having a volume resistivity between the limits of substantially $10^2$ to $10^{10}$ ohm centimeters to which is permanently attached a layer of a material having a volume resistivity less than $10^2$ ohm centimeters, and providing electric charges of opposite polarity upon a conducting object; providing a relatively thin layer of a material having a volume resistivity in excess of $10^{10}$ ohm centimeters between said conducting object and said member; and directing a stream of fluid having a temperature above ambient onto said conducting object and the thin layer of material having a volume resistivity in excess of $10^{10}$ ohm centimeters.

51. Apparatus comprising in combination, a supporting structure; a semiconducting element made from a material having a volume resistivity of between substantially $10^2$ and $10^{10}$ ohm centimeters and mounted in said supporting structure; a layer of a material having a volume resistivity less than $10^2$ ohm centimeters intimately and permanently attached to one face of said element; an electrical resistance heater within said supporting structure and adapted to supply thermal energy to an exposed surface of said element, said energy being sufficient to maintain said exposed surface above ambient; a power pack adapted to provide electric charges; and means for connecting said power pack and said layer of material having a volume resistivity less than $10^2$ ohm centimeters in series relation with a conducting object adapted to be moved relatively to the exposed surface of said semiconducting element.

52. Apparatus comprising in combination, a supporting structure; a semiconducting element made from a material having a volume resistivity of between substantially $10^2$ and $10^{10}$ ohm centimeters and mounted in said supporting structure; a layer of material having a volume resistivity less than $10^2$ ohm centimeters intimately and permanently attached to one face of said semiconducting element; an electrical resistance heater within said supporting structure and adapted to conduct thermal energy to an exposed surface of said semiconducting element, said energy being sufficient to maintain said exposed surface above ambient; an object adapted to be moved relatively to said exposed surface of said semiconducting element; a relatively thin layer of material having a volume resistivity in excess of $10^{10}$ ohm centimeters between said semiconducting element and said object; a power pack adapted to provide electrical charges; and means for connecting said power pack and said layer having a volume resistivity less than $10^2$ ohm centimeters in series relation with said conducting object.

53. Apparatus comprising in combination, a supporting structure; a semiconducting element made from a material having a volume resistivity of between substantially $10^2$ and $10^{10}$ ohm centimeters and mounted within said supporting structure; a layer of material having a volume resistivity less than $10^2$ ohm centimeters intimately and permanently attached to one face of said element; an electrical resistance heater within said supporting structure and adapted to supply thermal energy to an exposed surface of said semiconducting element, said energy being sufficient to maintain said exposed surface above ambient; a power pack adapted to provide electric charges; means for connecting said power pack and said layer having a volume resistivity less than $10^2$ ohm centimeters in series relation with a conducting object adapted to be moved relatively to the exposed surface of said semiconducting element; means for supplying power to said power pack; and means for supplying power to said electrical resistance heater independently of the supply of power to said power pack.

54. Apparatus comprising in combination, a supporting structure; a semiconducting element made from a material having a volume resistivity of between substantially $10^2$ to $10^{10}$ ohm centimeters and mounted within said supporting structure; a layer of a material having a volume resistivity less than $10^2$ ohm centimeters intimately and permanently attached to one face of said element; a power pack adapted to provide electric charges; means for connecting said power pack and said layer in series relation with a conducting object adapted to be moved relatively to said element; and means for providing at the interface between said conducting object and said semiconducting element, thermal energy sufficient to maintain said interface above ambient, and which energy is in addition to that incident to the provision of the electric charges by said power pack.

55. Apparatus comprising in combination, an element comprising a material having a volume resistivity of between substantially $10^2$ to $10^{10}$ ohm centimeters; a layer of material having a volume resistivity less than $10^2$ ohm centimeters intimately and permanently attached to one face of said element; an object adapted to be moved relatively to said element; a relatively thin layer of material having a volume resistivity in excess of $10^{10}$ ohm centimeters between said element and said object; a power pack adapted to provide electric charges; means for connecting said power pack and said layer having a volume resistivity less than $10^2$ ohm centimeters in series relation with said conducting object; and means for supplying at the interface between said conducting object and said semiconducting element thermal energy sufficient to maintain said interface above ambient, and which energy is in addition to that incident to the provision of the electric charges by said power pack.

56. The method of producing electrostatic forces of relatively high intensity which comprises providing electric charges of one polarity upon a member made from a material having a volume resistivity between the limits of substantially $10^2$ to $10^{10}$ ohm centimeters to which is permanently attached a layer of a material having a volume resistivity less than $10^2$ ohm centimeters, and providing electric charges of opposite polarity upon a conducting object; and providing a source of thermal energy conductively coupled to said semiconducting member and sufficient to maintain said semiconducting member above ambient.

57. The method of producing electrostatic forces of relatively high intensity which comprises providing electric charges of one polarity upon a member made from a material having a volume resistivity between the limits of substantially $10^2$ to $10^{10}$ ohm centimeters to which is permanently attached a layer of a material having a volume resistivity less than $10^2$ ohm centimeters, and providing electric charges of opposite polarity upon a conducting object; providing a relatively thin layer of a material having a volume resistivity in excess of $10^{10}$ ohm centimeters between said conducting object and said member; and providing a source of thermal energy conductively coupled to said member and sufficient to maintain said semiconducting member above ambient.

58. The method of producing electrostatic forces of relatively high intensity which comprises providing electric charges of one polarity upon a member made from a material having a volume resistivity between the limits of substantially $10^2$ to $10^{10}$ ohm centimeters to which is permanently attached a layer of a material having a volume resistivity less than $10^2$ ohm centimeters, and providing electric charges of opposite polarity upon a conducting object; providing a source of thermal energy conductively coupled to said member and sufficient to maintain said member above ambient; and supplying thermal energy to said conducting object sufficient to maintain said conducting object above ambient.

59. The method of producing electrostatic forces of relatively high intensity which comprises providing electric charges of one polarity upon a member made from a material having a volume resistivity between the limits of substantially $10^2$ to $10^{10}$ ohm centimeters to which is permanently attached a layer of a material having a volume resistivity less than substantially $10^2$ ohm centimeters, and providing electric charges of opposite polarity upon a conducting object; providing a relatively thin layer of a material having a volume resistivity in excess of $10^{10}$ ohm centimeters between said conducting object and said member; providing a source of thermal energy conductively coupled to said member sufficient to maintain said member above ambient; and supplying thermal energy to said conducting object sufficient to maintain said conducting object above ambient.

References Cited in the file of this patent

UNITED STATES PATENTS

| Number | Name | Date |
| --- | --- | --- |
| 583,957 | Thomson | June 8, 1897 |
| 851,516 | Hickley | Apr. 23, 1907 |
| 1,465,935 | Eastman | Aug. 28, 1923 |
| 1,675,911 | Roberts | July 3, 1928 |
| 1,834,786 | Kacser | Dec. 1, 1931 |
| 1,951,902 | Dempsey | Mar. 20, 1934 |
| 1,963,990 | Gilkeson et al. | June 26, 1934 |
| 2,025,123 | Rahbek | Dec. 24, 1935 |
| 2,120,091 | Densten | June 7, 1938 |
| 2,148,482 | Lorenz | Feb. 28, 1939 |
| 2,311,276 | Wilcox | Feb. 16, 1943 |
| 2,417,850 | Winslow | Mar. 25, 1947 |
| 2,568,824 | Rahbeck | Sept. 25, 1951 |
| 2,624,652 | Carlson | Jan. 6, 1953 |